United States Patent
Hogan et al.

(10) Patent No.: US 11,260,783 B2
(45) Date of Patent: Mar. 1, 2022

(54) OVERMOLD DECORATIVE FLOOR MAT EMBLEM

(71) Applicant: American Honda Motor Co., Inc., Torrance, CA (US)

(72) Inventors: Kyle L Hogan, Dublin, OH (US); Nicholas P Ziraldo, Powell, OH (US); Yasuyuki Takayama, Tochigi (JP)

(73) Assignee: American Honda Motor Co., Inc., Torrance, CA (US)

(*) Notice: Subject to any disclaimer, the term of this patent is extended or adjusted under 35 U.S.C. 154(b) by 2 days.

(21) Appl. No.: 16/535,586

(22) Filed: Aug. 8, 2019

(65) Prior Publication Data
US 2021/0039540 A1    Feb. 11, 2021

(51) Int. Cl.
| | |
|---|---|
| B32B 3/24 | (2006.01) |
| B60N 3/04 | (2006.01) |
| B29C 45/14 | (2006.01) |
| B29L 31/30 | (2006.01) |
| B29K 21/00 | (2006.01) |

(52) U.S. Cl.
CPC ........ B60N 3/044 (2013.01); B29C 45/14344 (2013.01); *B29K 2021/003* (2013.01); *B29L 2031/3017* (2013.01); *Y10T 428/24339* (2015.01)

(58) Field of Classification Search
CPC ...... Y10T 428/24339; B29C 45/14344; B60N 3/044
USPC .......................................... 428/67; 340/815.4
See application file for complete search history.

(56) References Cited

U.S. PATENT DOCUMENTS

| | | | | |
|---|---|---|---|---|
| 3,930,084 | A | | 12/1975 | Shields |
| 4,399,176 | A | * | 8/1983 | Bell ....................... B60N 3/044 |
| | | | | 296/97.23 |
| 4,921,742 | A | | 5/1990 | Altus |
| 6,132,834 | A | * | 10/2000 | Ackeret ................. B29C 33/14 |
| | | | | 428/67 |
| 6,564,397 | B1 | * | 5/2003 | Hawley .................. A47K 3/002 |
| | | | | 4/580 |
| 6,777,060 | B2 | | 8/2004 | Sehmer et al. |
| 8,382,182 | B2 | | 2/2013 | Stossel |
| 8,931,162 | B2 | | 1/2015 | Gonzalez et al. |
| 9,783,103 | B2 | | 10/2017 | Alshalabi |
| 10,245,991 | B1 | | 4/2019 | Salter et al. |
| 2011/0062742 | A1 | | 3/2011 | Alford |
| 2017/0072767 | A1 | | 3/2017 | Salter et al. |

FOREIGN PATENT DOCUMENTS

| | | |
|---|---|---|
| EP | 0543818 A1 | 6/1993 |
| JP | 5165392 B2 | 3/2013 |

* cited by examiner

*Primary Examiner* — William P Watkins, III
(74) *Attorney, Agent, or Firm* — Plumsea Law Group, LLC

(57) ABSTRACT

A floor mat including an elastomeric mat and an emblem with a base and a shell. The base has a portion supporting the shell and a peripheral flange portion surrounding the supporting portion and forming a hidden portion within the floor mat and having apertures. The shell overlays the supporting portion and forms a visible portion of the emblem on only one side of the floor mat. The apertures are essentially filled with elastomer to fix the emblem into the desired location on the floor mat. Also, the emblem and a method for making a floor mat.

20 Claims, 6 Drawing Sheets

OVERMOLD DECORATIVE FLOOR MAT EMBLEM

BACKGROUND OF THE DISCLOSURE

1. Field of the Disclosure

The present disclosure relates to overmolding of decorative emblems. In particular, the disclosure relates to overmolding of decorative emblems into a floor mat.

2. Description of Related Art

Floor finishing in the passenger compartment of many vehicles has evolved over the years from simple linoleum-type mats to modern carpeting systems. Mats to protect the carpeting surface then became popular as a way of protecting the carpet surface. Mats made of carpet-type material then were introduced. However, consumers, typically owners of vehicles used in dirty service or in rainy or snowy seasons, further demanded mats that precluded water and dirt from becoming embedded into the carpet.

Vehicle manufacturers seek to keep their logotypes and other images prominent in the consumer's mind. Therefore, emblems often are placed on the exterior of the vehicle and on interior surfaces. Floor mats, which comprise flexible material, provide an opportunity to display a logotype or emblem. Typically, such emblems comprise rigid material. However, attaching such a rigid object to a flexible surface can be difficult or require a complex or multi-step procedure. These additional steps increase cost. Further, once in place, the emblem may be easily damaged or disengaged from the floor mat if an edge protrudes from the surface.

There is a need in the art for a system and method that addresses the shortcomings of the prior art discussed above.

SUMMARY OF THE DISCLOSURE

In one aspect, the disclosure provides a floor mat. The floor mat comprises a mat and an emblem. The mat comprises an elastomer selected from the group consisting of thermoplastic elastomers, thermoset rubbers, thermoplastic vulcanizates, and blends thereof. The emblem has a base portion and a shell. The base portion comprises a supporting portion that supports the shell and a peripheral flange portion surrounding the supporting portion. The base portion forms a hidden portion within the floor mat and has apertures. The shell overlays the supporting portion and forms a visible portion of the emblem on only one side of the floor mat. The apertures are essentially filled with elastomer to fix the emblem into the desired location on the floor mat.

In another aspect, the disclosure relates to an emblem with a base portion and a shell. The base portion comprises a supporting portion that supports the shell and a peripheral flange portion surrounding the supporting portion and adapted to form the hidden portion within a structure formed around the emblem. The flange portion has apertures. The shell overlays the supporting portion and forms a visible portion of the emblem on only one side of the floor mat.

In still another aspect, the disclosure provides a method for making a floor mat comprising a mat comprising an elastomer selected from the group consisting of thermoplastic elastomers, thermoset rubbers, thermoplastic vulcanizates, and blends thereof and an emblem with a base portion and a shell. In accordance with the method, the emblem is placed into a mold for the floor mat with a visible portion of the emblem visible from only one side of the floor mat and a hidden portion of the emblem within the floor mat. The hidden portion comprises a border having apertures at the periphery of the visible portion of the emblem. The elastomer is injection molded to form the floor mat and to essentially fill the apertures with elastomer to fix the emblem into the desired location on the floor mat.

Other systems, methods, features, and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

In one aspect, the disclosure provides a floor mat. The floor mat comprises a mat and an emblem. The mat comprises an elastomer selected from the group consisting of thermoplastic elastomers, thermoset rubbers, thermoplastic vulcanizates, and blends thereof. The emblem has a base portion and a shell. The base portion comprises a supporting portion that supports the shell and a peripheral flange portion surrounding the supporting portion. The base portion forms a hidden portion within the floor mat and has apertures. The shell overlays the supporting portion and forms a visible portion of the emblem on only one side of the floor mat. The apertures are essentially filled with elastomer to fix the emblem into the desired location on the floor mat.

Figure 1:
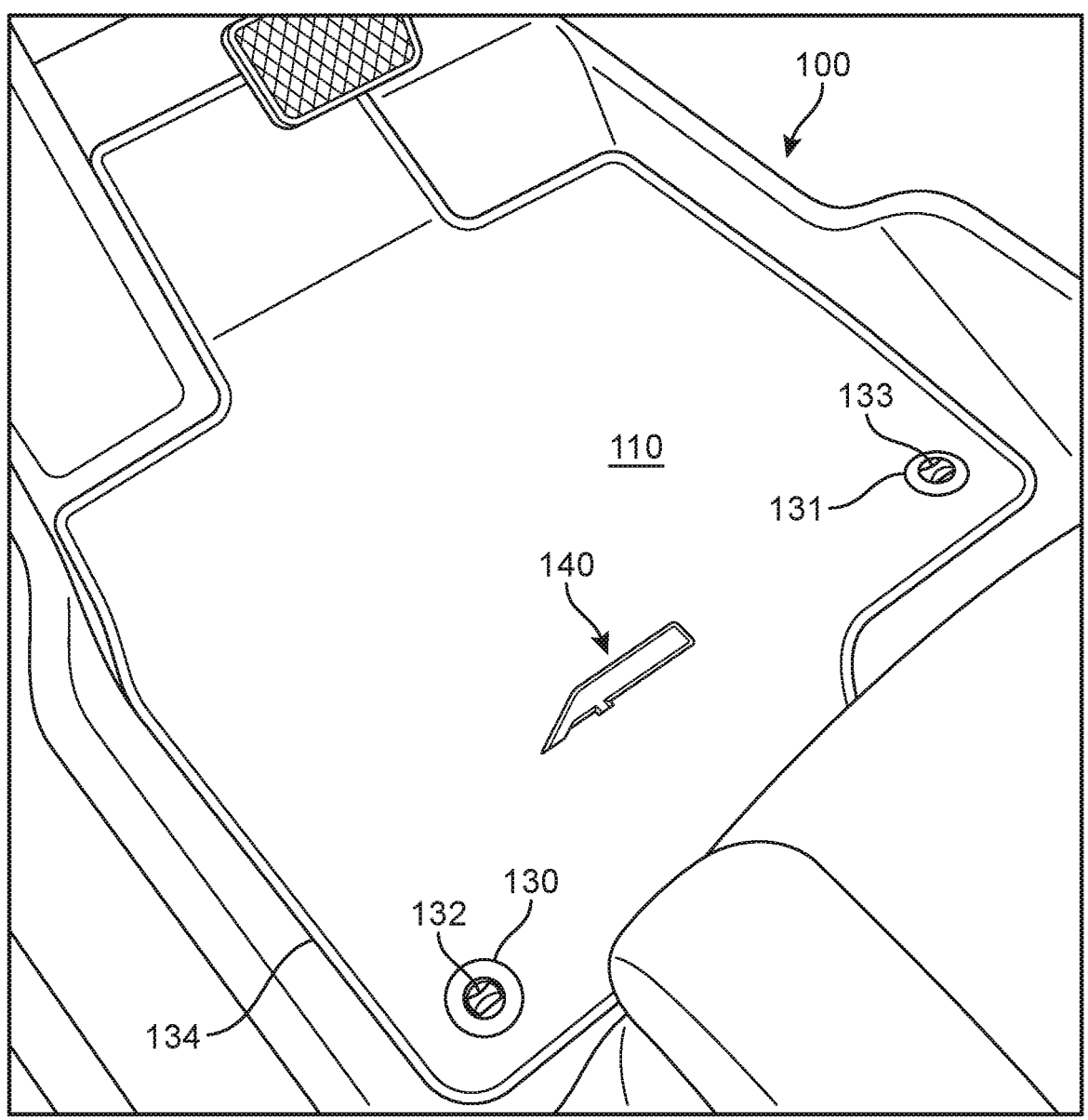
FIG. 1 is a schematic diagram of a floor mat of the disclosure including an emblem.

FIG. 1 illustrates an embodiment of floor mat 100 in a vehicle passenger cabin. Floor mat 100 includes mat 110 and emblem 140. Floor mat 100 also may have other features, such as first grommet 130 and second grommet 131. The grommets may provide a receiving element for first hook 132 and second hook 133 or similar retaining devices affixed to the floor of the vehicle. Edge feature 134 also may be present in some embodiments.

Embodiments of mat 110 comprise an elastomer selected from the group consisting of thermoplastic elastomers, thermoset rubbers, thermoplastic vulcanizates, and blends thereof. Thermoset elastomers are soft yet tough and flexible like thermoset rubbers. However, thermoplastic elastomers remain reprocessable by melting. Thermoplastic elastomers are polymers that are plastic above the melt temperature and exhibit elastomeric behavior without cross-linking below the melt temperature. Thus, they exhibit thermoplastic and elastomeric properties and characteristics. Mat 110 may have typical ranges of toughness, resistance to abrasion, flexibility in both hot and cold weather, softness for comfort, resistance to water and other chemicals that may be introduced into a vehicle and onto floor mat 100, such as gasoline and motor oil, and other properties and characteristics appropriate to the use of floor mat 100. These properties and characteristics may be developed in embodiments of elastomers.

In embodiments, thermoplastic elastomers may be blends of polymers that are mechanical mixtures of semi-crystalline polymers with amorphous polymers. In some embodiments, thermoplastic elastomers may be block polymers comprising discrete blocks of crystalline and amorphous domains within the same polymer chain. Thermoplastic elastomers are two (or more) phase materials. Each of the domains contributes properties and characteristics to the thermoplastic elastomer. Thus, thermoplastic elastomers may be designed to comprise polymeric compositions to achieve specific properties.

Six generic classes of thermoplastic elastomers are recognized, as follows: (1) styrenic block copolymers (SBC): block copolymers and terpolymers of styrene and butadiene;

(2) polyolefin blends (TPO): blends of polypropylene and un-crosslinked poly(ethylene propylene diene monomer) (EPDM) rubber;

(3) elastomeric alloys (TPV): blends of polypropylene and vulcanized (cross-linked) EPDM rubber;

(4) thermoplastic polyurethanes (TPU): linear segmented block copolymers formed by the reaction of diisocyanates with short-chain diols and diisocyanates with long-chain diols;

(5) thermoplastic copolyesters (COPE): copolymers of bifunctional aromatic polyesters with ether linkages; and (6) thermoplastic polyamides (PEPA): copolymers obtained by polycondensation of a carboxylic acid polyamide with an alcohol-terminated polyether.

In some embodiments, the properties and characteristics of members of these classes of thermoplastic elastomers may be developed to match those typically found in floor mat 100.

Thermoplastic elastomers and thermoset rubbers have advantages for various properties and characteristics. For example, thermoplastic elastomers are reprocessable and recycleable, whereas thermoset rubbers are neither. Thermoplastic elastomers may be advantageously used when ease of compounding, ease of molding, and overmolding are important and the manufacturer is not well versed or experienced in processing thermoset rubbers. Thermoplastic elastomers also may be advantageous if another component to be overmolded must be kept at temperatures used to mold thermoplastic elastomers. On the other hand, thermoset rubbers may be preferred if chemical resistance, thermal stability, or creep and set resistance are important properties and characteristics. The skilled practitioner will be able to select a suitable elastomer.

Whereas thermoplastic elastomers are two (or more)—phase blends of compositions that do not react, thermoset rubbers are single phase reaction products of at least two compositions. Cross-links in the form of covalent bonds between chains of polymer in thermoset rubbers bind the individual chains. In some embodiments, mat 110 may be formed from a common thermoset rubber, such as natural rubber (commonly abbreviated NR); polyisoprene (IR); polychloroprene (CR); styrene butadiene rubber (SBR); nitrile butadiene rubber (NBR); ethylene propylene diene monomer rubber (EPDM); butyl rubber (IIR); polybutadiene (BR); epichlorohydrin (ECO); fluorinated hydrocarbon (FKM); and silicone rubber (Q). Thermoset rubbers are suitable for overmolding and are easily molded and compounded. Whereas a thermoplastic elastomer is molded in a cold mold to reduce the temperature to below the solidification point, a thermoset rubber is molded in a hot mold to ensure complete reaction.

Thermoplastic vulcanizates, also known as elastomeric alloys, are rubber-like materials that, unlike conventional thermoset rubber, can be processed and recycled like thermoplastic materials. Thermoplastic vulcanizates are fully dynamically vulcanized thermoset rubber in a thermoplastic matrix of polyolefin. In some embodiments, thermoplastic vulcanizates look, feel, and behave like rubber. However, the polyolefin content enables manufacture of objects lighter than rubber alone. The main advantage of a TPV over rubber is lower weight for parts with a similar design. The weight reduction can be as high as 30%. Thermoplastic vulcanizates are essentially high performance elastomers that exhibit the properties of the thermoset rubber they contain, yet provide a material that can be processed as the matrix plastic is processed. This allows simplified, more flexible part design and easier manufacturing when compared to thermoset rubber.

Figure 2:
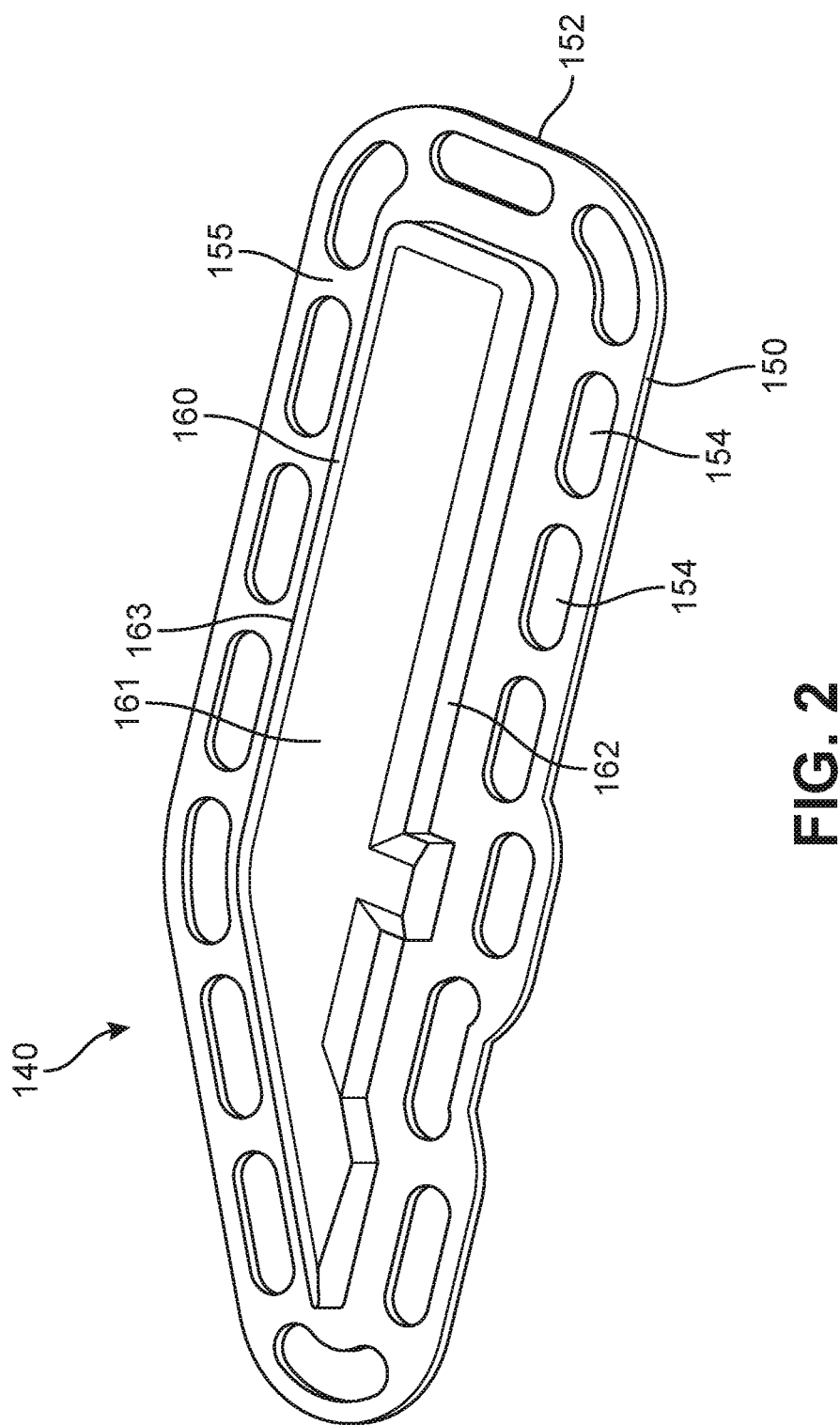
FIG. 2 is a schematic diagram of an emblem of the disclosure.

In another aspect, the disclosure relates to an emblem with a base portion and a shell. FIG. 2 is a perspective view of emblem 140. Some of the features of emblem 140 are better seen in FIGS. 4 and 5, which are cross-section views along line A-A of FIG. 3. As seen in the figures, base portion 150 comprises a supporting portion 151 that supports shell 160. Base portion 150 also includes peripheral flange portion 152. In some embodiments, for example when the emblem is in place on mat 110, peripheral flange portion 152 forms a hidden portion 153 (FIG. 4) within mat 110. Peripheral flange portion 152 has apertures 154 spaced along its periphery and defined by a web 155. In some embodiments, apertures 154 are of equal size and shape around the periphery of emblem 140, as illustrated in FIG. 2. In some embodiments, apertures 154 may be of different sizes. In some embodiments, apertures 154 may have different shapes, such as circles, fleches facing inwardly, outwardly, to the left, or to the right, or stars.

Figure 4:
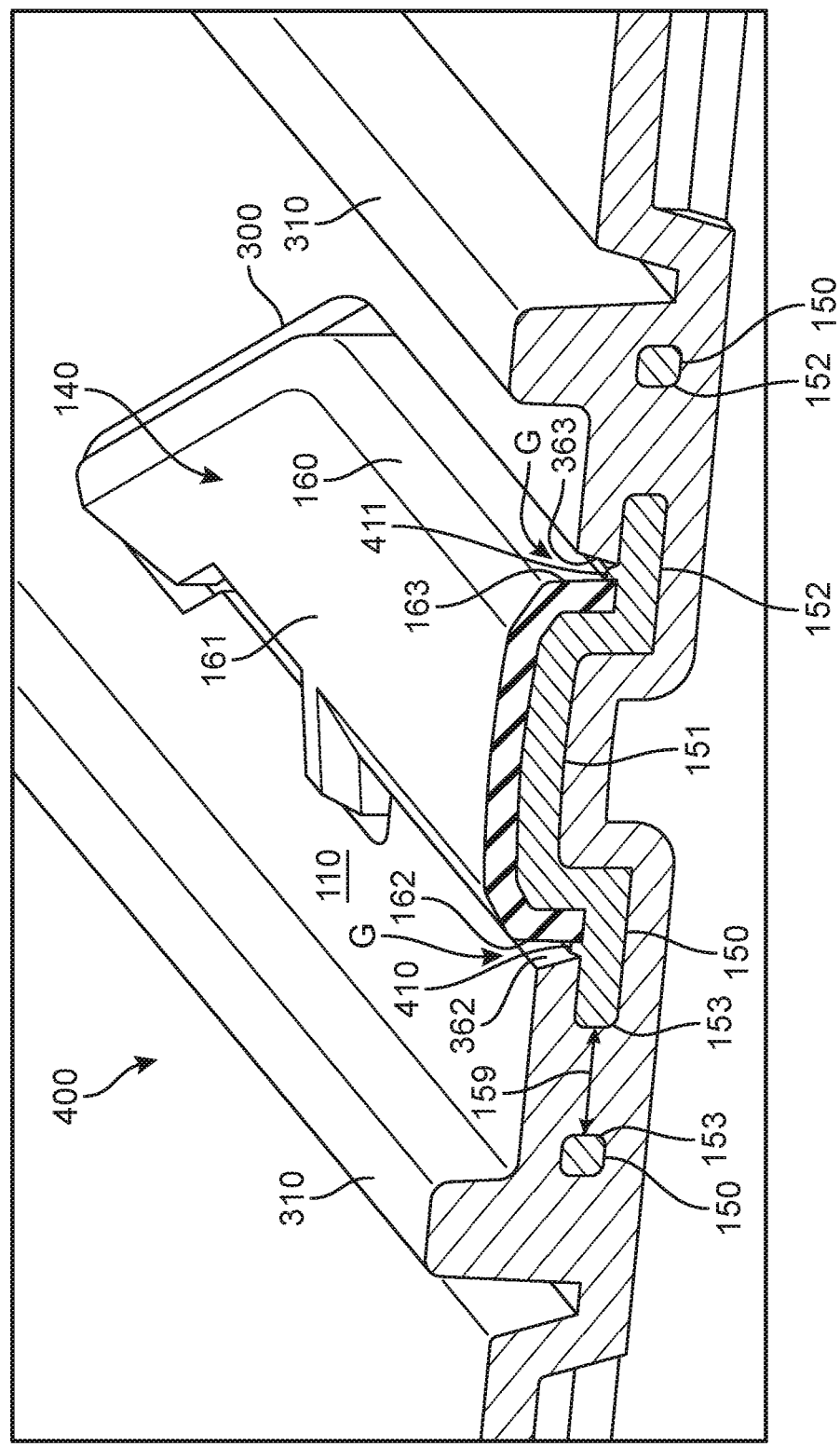
FIG. 4 is a perspective in cross-section of a portion of the floor mat with the emblem in place viewed along line A-A.

Apertures 154 must be of sufficient size to allow the elastomeric composition of mat 110 to flow through apertures 154 during overmolding to securely integrate emblem 140 into matt 110. This flow-through feature is illustrated in FIG. 4 at 159. Apertures 154 are essentially filled with elastomer from mat 110 to fix emblem 140 to mat 110. Peripheral flange portion 152 is described as a flange to indicate that the part is located at the opposite end of the structure formed by supporting portion 151, such that, when viewed in cross-section, flange 152 forms a lower base structure surrounding the supporting portion 151. Use of the word flange is intended to define its location generally at the end of that structure, as opposed to a collar, which would be disposed about midway along a vertical height.

Web 155 of flange 152 preferably is proportioned such that the web-to-aperture ratio generally favors the apertures. In other words, apertures 154 make up more than about 50 percent of the flange as compared to web 155.

Figure 5:
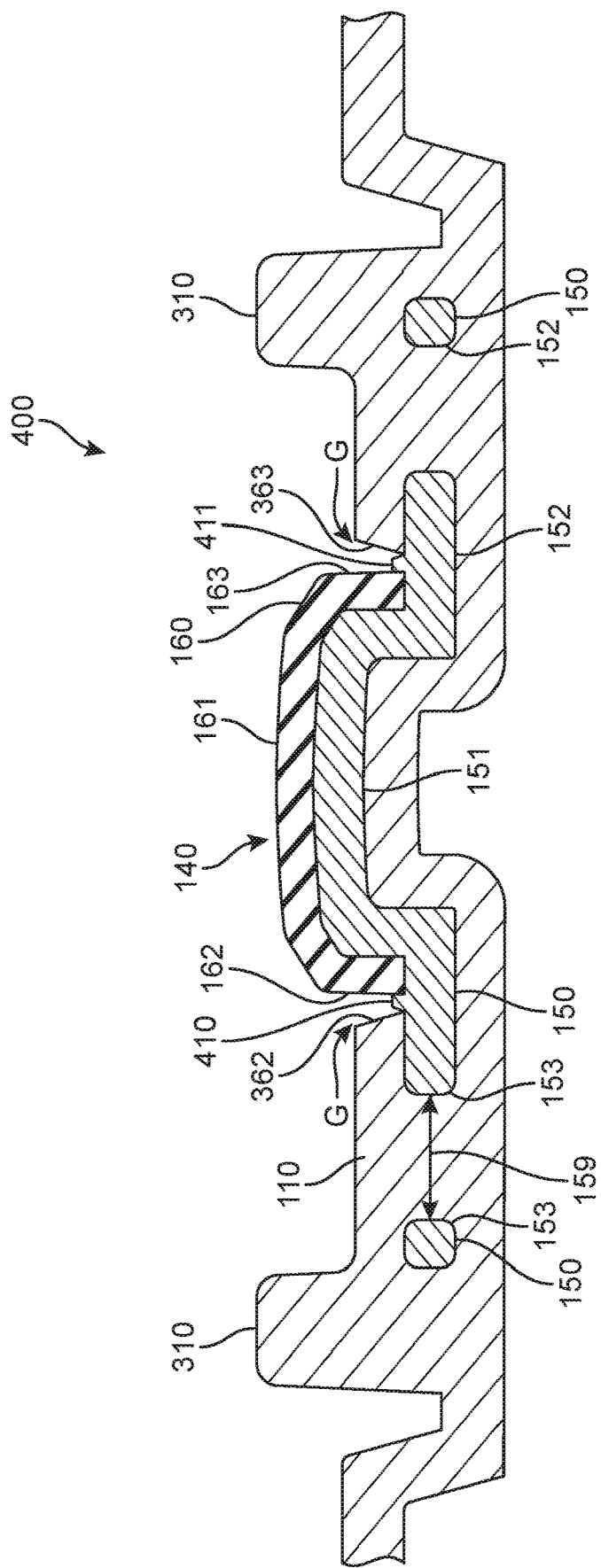
FIG. 5 is a cross-section of a portion of the floor mat viewed along line A-A of the disclosure with the emblem in place.

In some embodiments, shell 160 is supported on supporting portion 151, as is best seen in FIGS. 4 and 5. In some embodiments, shell 160 forms an inverted essentially channel shaped, in cross section, visible portion having top 161, a first side 162, and a second side 163. First side 162 and second side 163 are generally vertical with respect to the generally horizontal top 161. Shell 160 is visible when emblem 140 is associated with mat 110 to form floor mat 100.

In some embodiments, shell 160 may be undecorated. In other embodiments, top 161 is decorated. The decoration may take the form of a design. In other embodiments, the decoration may be the name or the logotype of the manufacturer or model of the vehicle, or of any label associated with the vehicle. Any decoration may be suitable. As can be seen in FIGS. 4 and 5, shell 160 is visible from only one side of the floor mat 100 and of mat 110, that is, the top surface of the floor mat 110.

Emblem 140 may be made from any composition that does not melt or distort when overmolded into mat 110. Emblem 140 may comprise, for example, plastic or metal, such as die-cast metal. In particular, shell 160 may comprise plastic that has a metallic coating applied thereto to provide a metallic appearance. The coating may be in the form of a thin plastic film, and may also be applied to a die-cast shell. Die-cast metal is suitably covered with an opaque metal-appearance finish, in part because the finish of die-cast metal may not be even and may not provide the impression of a quality product. Shell 160 may be decorated with any suitable medium, such as file or paint. In embodiments, the two parts may be attached to each other in any suitable manner. For example, the parts may be glued together, sonically welded, or otherwise attached. In some embodiments, a friction fit may be appropriate for this connection.

Figure 3:
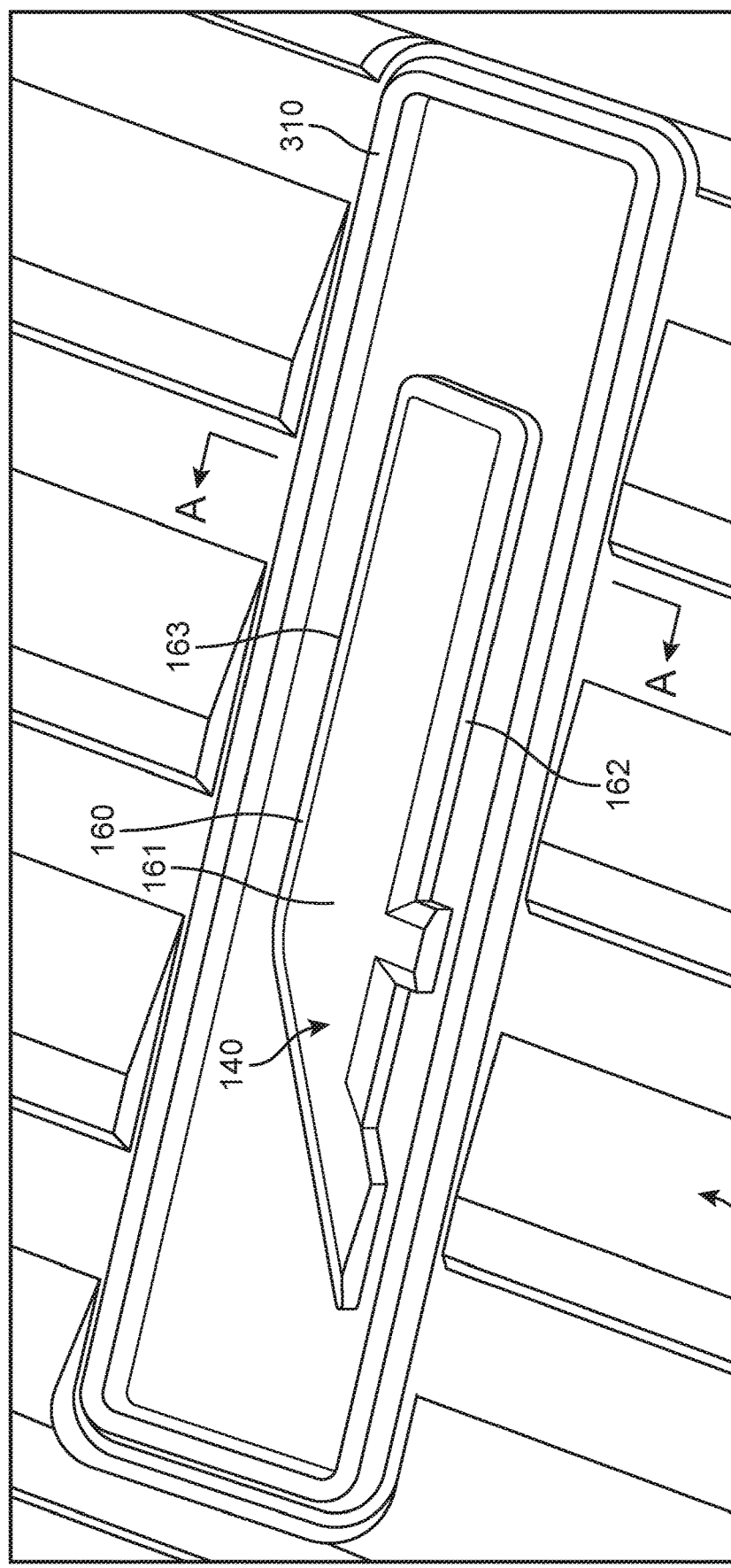
FIG. 3 is a close-up schematic of an emblem in place on a floor mat of the disclosure.

FIG. 3 illustrates a close-up of floor mat 100. FIG. 3 and FIG. 5, which illustrates section A-A on FIG. 3, illustrate emblem 140 overmolded into mat 100. Floor mat 100 is designed with an emblem location. In some embodiments, this location is formed as a defined recess or cavity 300 (FIG. 4). Emblem 140 is designed to fit into recess 300. Peripheral flange portion 152 (FIG. 4) cannot be seen on FIG. 3, thus forming a hidden portion 153 within mat 110. In some embodiments, emblem 140 is in a planar portion of mat 110 having a raised portion 310 surrounding emblem 140. In some embodiments, shell 160 may extend above raised portion 310. In some embodiments, shell 160 may be below raised portion 310. Thus, raised portion 310 may protect the appearance of shell 160 by limiting the amount of exposure of the mat to damage from users of the mat.

As can best be seen in FIGS. 4 and 5, in some embodiments, there is a space or a gap G between first side 162 and first mat emblem edge 362. There is a similar space or gap G between second side 163 and second mat emblem edge 363. This space G ensures that the elastomer of mat 110 is spaced away from the sides of emblem 140 to form a recess between emblem 140 and mat 110 larger than the visible portion of the emblem 140.

This space G provides many benefits. During the molding process, the space G makes it easier to locate emblem 140 in the mold without causing defects such as scratching the finish of the emblem. The space also helps hide any defects on first side 162 or second side 163 in the completed floor mat. In some embodiments, the space adds an element of depth and enhances visual dimensionality to emblem 140 on mat 110.

In some embodiments, first rib 410 and second rib 411 are formed on peripheral flange 152, as illustrated in FIGS. 4 and 5. First rib 410 and second rib 411 may serve to make it easier to ensure that the mold (not shown) can engage with peripheral flange 152 to form a sharp first mat emblem edge 362 and second mat emblem edge 363. First rib 410 and second rib 412 may have the shape illustrated in FIGS. 4 and 5 in some embodiments. In some embodiments, the cross-sectional shape of the ribs may be different. In some embodiments, first rib 411 and second rib 412 may be continuous and form a single rib. In some embodiments, first rib 410 and second rib 411 may be separate, with a separation or space between the ribs.

In some embodiments, first rib 410 is in contact with first side 162 of shell 160 and second rib 411 is in contact with second side 163 of shell 160. When rib 410 contacts shell 160, shell 160 may be better aligned with features on mat 110, such as raised portion 310. In some embodiments, rib 410 may further provide some additional holding force and making it more difficult to dislodge cap 160 from base 150.

While the illustrated embodiment shows a recess 300 that provides a gap G around the sidewalls 162 and 163 of emblem 140, it is also possible to design recess 300 so that walls 162 and 163 abut more closely to the recess.

Figure 6:
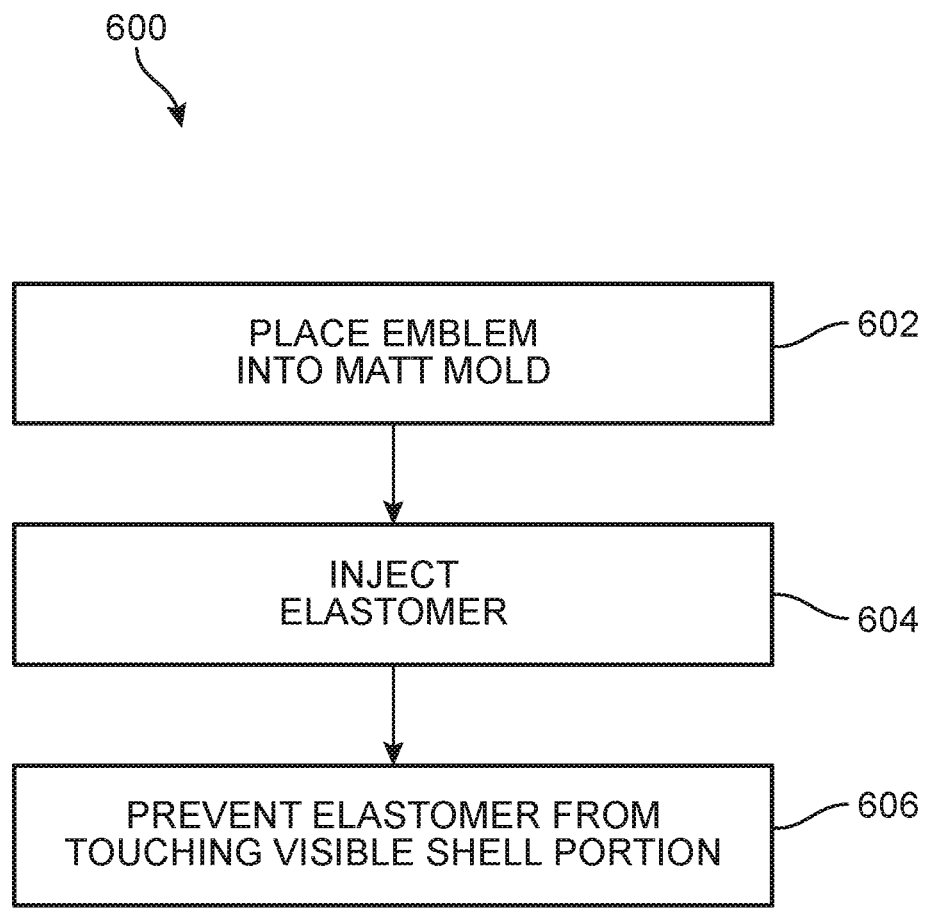
FIG. 6 is a diagram of a method of the disclosure.

In still another aspect, the disclosure provides a method for making a floor mat comprising a mat comprising an elastomer selected from the group consisting of thermoplastic elastomers, thermoset rubbers, thermoplastic vulcanizates, and blends thereof and an emblem with a base portion and a shell. FIG. 6 is a diagram of the method. In accordance with method 600, the emblem is placed into a mold for the floor mat with a visible shell portion of the emblem visible from only one side of the floor mat and a hidden base portion of the emblem within the floor mat in step 602. The hidden base portion comprises a flange having apertures at the periphery of the hidden portion of the emblem.

In step 602, the elastomer is injection molded to form the floor mat. In step 604, the elastomer essentially fills the apertures with elastomer to fix the emblem into the desired location on the floor mat.

In some embodiments, the method further comprises (step 606) preventing elastomer from touching the visible shell portion. In step 606, a space between a side of the visible shell portion and the mat is formed. A rib (410 and 411 on FIG. 4) may assist in formation of the space.

Emblem 140 may be any size, and is limited only by the dimensions of mat 110. Emblem 140 also may have any shape that can be formed in the composition of matter of shell 160. Thus, although emblem 140 is rectangular, emblem 140 may be circular, ovoid, square, or any other shape.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A floor mat comprising:
    a mat comprising an elastomer selected from the group consisting of thermoplastic elastomers, thermoset rubbers, thermoplastic vulcanizates, and blends thereof, the mat including a recess defining an emblem location; and
    an emblem disposed in the emblem location and having a with a base portion and a shell,
    the base portion comprising a supporting portion that supports the shell and a peripheral flange portion including a web with apertures provided therein, the flange portion surrounding the supporting portion and forming a hidden portion of the emblem within the mat, the shell attached to and overlaying the supporting portion and forming a visible portion of the emblem on only one side of the floor mat;

wherein the apertures enable the elastomer to flow through during manufacture and become essentially filled with elastomer to thereby affix the emblem into the emblem location on the floor mat.

2. The floor mat of claim 1, wherein the shell has a top and sidewalls covering the base portion to provide the visible portion of the emblem.

3. The floor mat of claim 1, further comprising a rib on the peripheral flange portion surrounding the supporting portion and engaging the sidewalls of the shell.

4. The floor mat of claim 3, wherein the recess defining the emblem location is formed by engaging a molding tool on the rib.

5. The floor mat of claim 1, wherein the apertures of the flange are of the same size and shape.

6. The floor mat of claim 1, wherein the apertures of the flange comprise more than 50% of the surface of the flange compared with the web.

7. The floor mat of claim 1, wherein the flange extends substantially horizontally from the base portion.

8. The floor mat of claim 1, wherein the base portion is a different composition of matter from the shell.

9. The floor mat of claim 1, wherein the recess defining the emblem location is sized larger than the emblem to provide a space between the emblem and the mat.

10. An emblem for a floor mat comprising:
  a base portion comprising a supporting portion and a peripheral flange portion surrounding the supporting portion, said flange portion including a web with apertures, and adapted to form a hidden portion within an elastomer structure formed by overmolding around the emblem; and
  a shell with a top surface and sidewalls attached to and overlaying the supporting portion and providing a decorative face to form a visible portion of the emblem such that said emblem is adapted to be visible only one onside of a floor mat.

11. The emblem of claim 10, further comprising a rib on the peripheral flange portion surrounding the supporting portion and engaging the sidewalls of the shell.

12. The emblem of claim 11, wherein the apertures are of the same size and shape.

13. The emblem of claim 10, wherein the apertures of the flange comprise more than 50% of the surface of the flange compared with the web.

14. The emblem of claim 10, wherein the flange extends substantially horizontally from the base portion.

15. The emblem of claim 10, wherein the base portion is a different composition of matter from the shell.

16. The emblem of claim 10, wherein the base portion is the same composition of matter as the shell.

17. A method for making a floor mat comprising a mat comprising an elastomer selected from the group consisting of thermoplastic elastomers, thermoset rubbers, thermoplastic vulcanizates, and blends thereof and an emblem with a hidden base portion and a visible shell portion, the method comprising:
  placing the emblem into a mold for the floor mat, such that said emblem has a visible shell portion of the emblem visible from only one side of the floor mat and a hidden base portion of the emblem within the floor mat;
  wherein the hidden base portion comprises a flange having apertures at the periphery of the visible shell portion of the emblem; and
injection molding the elastomer to mold the floor mat and to essentially fill the apertures with elastomer to thereby affix the emblem into the desired location on the floor mat.

18. The method of claim 17, further comprising the step of providing a recess at the desired emblem location that is larger than the emblem in the mat to provide space between the visible shell portion of the emblem and a top surface of the mat.

19. The method of claim 18, wherein said step of providing a recess includes engaging the mold to a protruding rib on the emblem proximate the flange.

20. The method of claim 17, further comprising the step of removing the floor mat from the mold.

* * * * *